UNITED STATES PATENT OFFICE.

CARL BOSCH, ALWIN MITTASCH, AND HANS WOLF, OF LUDWIGSHAFEN-ON-THE-RHINE, AND GEORG STERN, OF MANNHEIM, GERMANY, ASSIGNORS TO BADISCHE ANILIN & SODA FABRIK, OF LUDWIGSHAFEN-ON-THE-RHINE, GERMANY, A CORPORATION.

PRODUCTION OF AMMONIA.

1,094,194.     Specification of Letters Patent.     Patented Apr. 21, 1914.

No Drawing.     Application filed December 24, 1910. Serial No. 599,100.

*To all whom it may concern:*

Be it known that we, CARL BOSCH, ALWIN MITTASCH, HANS WOLF, and GEORG STERN, doctors of philosophy and chemists, subjects the first and fourth of the King of Prussia, the second of the King of Saxony, and the third of the King of Bavaria, residing the first three at Ludwigshafen-on-the-Rhine and the fourth at Mannheim, all in Germany, have invented new and useful Improvements in the Production of Ammonia, of which the following is a specification.

Our invention relates to the manufacture of ammonia by synthesis from its elements. In our researches on the synthetic manufacture of ammonia from its elements, we have discovered that the power of catalytic agents generally for the production of ammonia by synthesis can be improved by the presence of certain bodies which we have termed promoters. We have further found that certain other bodies act as contact poisons and tend to destroy the catalytic power of the catalyst for converting a mixture of nitrogen and hydrogen into ammonia. In the present application for patent we desire, in particular, to cover this invention generically.

In the specification of application for Patent Serial No. 599,101 of even date herewith, we have described a new form of iron which is capable of use as a catalytic agent in the manufacture of ammonia from its elements, and have further shown that the catalytic power of iron can be improved by the presence of promoters, and that certain other bodies act as contact poisons, and as this specific invention is claimed in the said specification Serial No. 599,101 we make no specific claim to it in this application.

As a general rule admitting of several exceptions, compounds of the alkali metals and the alkaline earth metals act as promoters of the catalytic power. On the other hand, the metalloids, such as for instance, as sulfur, selenium, tellurium, arsenic, phosphorus, and also the easily fusible and easily reducible metals, such for instance as lead, tin, and zinc, generally act as contact poisons, whether the said element be added or be present as such or in the form of a suitable compound thereof. Of these contact poisons we have mentioned sulfur in the first place, as this is very liable to be present, for instance, if the catalyst or the promoter be produced from a compound containing sulfur, such as a sulfid ore or the like, or if the gases employed during the reaction be dried by means of sulfuric acid. Since it is evident that during the passage of the mixture of hydrogen and nitrogen over the contact material the body or promoter added may undergo some chemical change, we do not wish to be understood as confining our invention to the use of the specific compounds of the elements mentioned.

Although we have mentioned a number of bodies which act as promoters and a number of instances of contact poisons, these instances do not exhaust the number of bodies having the effects mentioned. We have found that an enormous number of bodies have more or less action in the ways mentioned, and these bodies belong to various classes of chemical substances, so that it is impossible to give a definition of promoters in terms making the class of promoters coincident with some class or classes of chemical bodies. Thus we have found that bodies that are not alkaline earths or alkaline metals or compounds thereof will act as promoters, and we do not desire our patent to be restricted to promoters which fall into the classes of alkaline earths and alkalies. We have devised a simple test whereby it can readily be ascertained whether any body is a promoter in the sense of this specification. The test is conducted as follows: Prepare an intimate mixture of the test body and catalyst in a suitable way. This may be done in some cases by mechanical mixture, in others by chemical precipitation on to the catalyst, or by melting with an oxid of the catalyst, or with the catalyst itself, with or without subsequent reduction with hydrogen or ammonia, or by mixing solutions of catalyst and test body and evaporating to dryness, or by a combination of one or more of these methods. Set the product so obtained as a catalyst in a tube furnace side by side with another tube containing an equal quantity of the untreated catalyst without any addition, and pass equal currents of a mixture of nitrogen and hydrogen in their combining proportions through both tubes under identical conditions, and measure the quantity of ammonia obtained in both cases. If the yield of ammonia be increased by the treatment with the added body, this may be regarded as a promoter.

As instances of catalytic agents which can be employed according to our invention, we mention the members of the alkali group, of the alkaline earth group, of the group of earth metals, of the iron group with the exception of iron itself, and osmium. These catalytic agents may be employed either in the form of the metals themselves or compounds of the metals may be used which, during the passage of the nitrogen and hydrogen at the requisite temperature, give rise either to a metal or to a hydrid, nitrid, or the like, thereof. As instances of the bodies which can be employed as promoters according to our invention we mention oxids or other suitable compounds of the group of alkali metals, of the alkaline earth metals, of the group of the earth metals, of the group of the rare earth metals, also tantalum, niobium, and the like. We include in this invention both alkali metals and alkali earth metals under the phrase alkali-forming metals. As a general rule those metals or compounds thereof which yield oxids and salts non-reducible by hydrogen are suitable for use as promoters. Generally speaking, any one or more of the aforesaid promoters can be employed with any one of the catalytic agents hereinbefore mentioned.

In order to obtain the intimate mixture of catalyst and promoter, any suitable method can be employed, for instance, the catalyst can be soaked with a solution of the promoter, or a mixture of a salt of the catalytic metal with the promoter or a compound thereof can be heated and then reduced, or the catalyst and a promoter can be melted together and, if necessary, subsequently reduced; or amalgams of the two bodies can be mixed and the mercury then distilled off, or a mixture of the chlorids can be reduced with hydrogen or with ammonia, or a mixture of the oxids can be converted by suitable means into the metals, or a carbid, or nitrid, or carbid-nitrid, or amid, or hydrid, or the like of one or both of them. The intimate mixture so obtained can generally be directly placed in the contact tube. Since it is important to avoid the introduction of poisons into the catalyst, it is desirable to employ initial materials which are free from such contact-poisons, and it is generally most convenient to start from the purest materials obtainable. Further the gases employed should be carefully purified from any materials which are liable to poison the catalyst. The temperature which may be employed during the reaction varies within wide limits, for instance temperatures between 300° and 900° C. may be employed, whereby it should be remembered that with decreasing temperature the velocity of formation of the ammonia decreases, while at higher temperatures, although the velocity of formation is greater, the state of equilibrium alters, so that the percentage of ammonia contained in the gases leaving the catalyst is lower. It is preferred to carry out the catalysis under pressure and particularly under high pressure, for instance from 50 to 200 atmospheres. When working according to this invention, yields of eight per cent. or more of ammonia in the gases leaving the catalyst can easily be obtained, but we do not regard it as departing from the nature of our invention if the velocity of the gases passing over the catalyst and the other conditions of working are so chosen that the gases leaving the catalyst contain less than this amount of ammonia.

It has been found advantageous that the catalytic mixture consist of metals or of compounds of metals belonging, preferably, to different groups or, at any rate, to different sub-groups of the periodic system. Thus for example the following pairs of metals or suitable compounds thereof, as hereinbefore explained, can be used according to this invention: aluminium-magnesium, aluminium-manganese, barium-chromium, barium-magnesium, barium-osmium, calcium-nickel, cerium-magnesium, cerium-molybdenum, cobalt-lithium, cobalt-magnesium, cobalt-osmium, chromium-magnesium, chromium osmium, chromium-zirconium, cobalt-sodium, lanthanum-molybdenum, lithium-manganese, lithium-nickel, lithium-niobium, lithium-osmium, lithium-tungsten, lithium-vanadium, magnesium-molybdenum, magnesium-sodium, magnesium-uranium, magnesium-vanadium, manganese-osmium, manganese-vanadium, molybdenum-tantalum, molybdenum-zirconium, potassium-vanadium, sodium-osmium, thorium-osmium, tungsten-zirconium, uranium-zirconium, vanadium-zirconium.

The following examples will serve to illustrate further the nature of our invention, which, however, is not in any way confined to these examples.

Example 1: Take metallic cerium which has been prepared electrolytically and is in the condition of small grains, and mix it with about two per cent. of its weight of powdered potassium nitrate, and then place the mixture in the contact tube. On passing a mixture of nitrogen and hydrogen which is completely dry and free from oxygen and contact poison through the tube, while heating, a catalytic agent is obtained which gives for instance at 600° C. and 100 atmospheres pressure about three times the yield of ammonia which the untreated cerium gives.

Example 2: Mix osmium, or osmium oxid hydrate (cf. Berichte, 40, p. 1387), with ten per cent. of its weight of potassium osmate, and then place the mixture in the contact tube and pass a current of pure hydrogen through the tube while heating. A catalytic agent is obtained which for instance at 400° C. and 200 atmospheres pressure gives better results than does the untreated osmium, such for instance as the osmium which is merely precipitated on to asbestos as described in Letters Patent No. 971,501.

Example 3: Mix metallic barium with three per cent. of its weight of potassium nitrate and place the mixture in a contact tube. On passing the mixture of nitrogen and hydrogen which is completely dry and free from oxygen and contact poison through the tube while heating at about 600° C. and while employing a pressure of 100 atmospheres, results are obtained which are several times better than those obtained with barium alone. In this example, instead of barium, lithium, or calcium, or aluminium, can be employed, either in the form of metal or as nitrid, or amid, or hydrid, or carbid.

Example 4: Digest powdered cobalt oxid (obtained by heating cobalt nitrate to redness) with a five per cent. solution of sodium nitrate. Filter off the solution and place the damp powder in the contact tube or furnace, dry, and then reduce the mixture by means of a current of hydrogen free from contact poison. Place the resulting mass in a contact furnace and pass a mixture of nitrogen and hydrogen in combining proportions through the said furnace, while employing a temperature of 650° C. and a pressure of 150 atmospheres.

Example 5: Add a small quantity of potassium oxid to an amalgam of mercury and manganese, and then heat in a current of pure dry ammonia gas until the mercury has distilled away, and then place the remaining mass in a contact tube and pass a current of dry, pure hydrogen and nitrogen in combining proportions through the tube at from 500° to 600° C., and at a pressure approaching 200 atmospheres.

Example 6: Mix cobalt with five per cent. of its weight of aluminium and then apply a light to the mixture and melt the product in a current of oxygen. Then reduce the product so obtained with hydrogen free from contact poison. The oxygen used should also be free from contact poison. The catalytic agent which can be employed in the form of grains, gives good yields of ammonia, for instance when employed at a temperature of 500° C. and at a pressure of 50 atmospheres.

The production of ammonia when making use of either manganese, barium, cerium or osmium together with a promoter in each case although claimed generically herein is claimed specifically in Patents Nos. 1,068,966; 1,068,967; 1,068,968 and 1,068,969 and is therefore not claimed specifically in this present application.

Now what we claim is:—

1. The process of manufacturing ammonia by passing a mixture containing nitrogen and hydrogen free from contact poison over an active catalyst containing a catalytic agent, and a promoter.

2. The process of manufacturing ammonia by passing a mixture containing nitrogen and hydrogen over an active catalyst containing a catalytic agent and a promoter, while substantially avoiding the presence of sulfur.

3. The process of manufacturing ammonia by passing a mixture containing nitrogen and hydrogen free from contact poison over an active catalyst containing cobalt and a promoter.

4. The process of manufacturing ammonia by passing a mixture containing nitrogen and hydrogen free from contact poison over an active catalyst containing cobalt and an oxid of an earth metal.

5. The process of manufacturing ammonia by passing a mixture containing nitrogen and hydrogen free from contact poison over an active catalyst containing cobalt and alumina.

In testimony whereof we have hereunto set our hands in the presence of two subscribing witnesses.

CARL BOSCH.
ALWIN MITTASCH.
HANS WOLF.
GEORG STERN.

Witnesses:
ERNEST G. EHRHARDT,
J. ALEC LLOYD.